(12) United States Patent
Martorana et al.

(10) Patent No.: US 6,486,831 B1
(45) Date of Patent: Nov. 26, 2002

(54) METHODS AND APPARATUS FOR ESTIMATING ACCURACY OF MEASUREMENT SIGNALS

(75) Inventors: Marc J. Martorana, Lake Hiawatha, NJ (US); Scott C. Martorana, Hackettstown, NJ (US); Steven Galgano, Staten Island, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/839,576

(22) Filed: Apr. 23, 2001

(51) Int. Cl.$^7$ ................................................. G01S 3/02
(52) U.S. Cl. ...................................................... 342/458
(58) Field of Search ............................ 342/118, 357.02, 342/457, 458; 455/456, 457

(56) References Cited

U.S. PATENT DOCUMENTS

| | | | | |
|---|---|---|---|---|
| 3,975,731 A | * | 8/1976 | Latham et al. | 343/7.3 |
| 4,954,837 A | * | 9/1990 | Baird et al. | 342/458 |
| 5,883,595 A | * | 3/1999 | Colley | 342/357 |
| 6,176,837 B1 | * | 1/2001 | Foxlin | 600/595 |

OTHER PUBLICATIONS

U.S.P.A. 09/365,702 Dennis McCrady, et al., "Method and Apparatus for Determining the Position of a Mobile Communication Device Using Low Accuracy Clocks", filed Aug. 2, 1999.

U.S.P.A. 09/777,625 Dennis McCrady, et al., "Method and Apparatus for Determining the Position of a Mobile Communication Device", filed Feb. 6, 2001.

* cited by examiner

*Primary Examiner*—Dao Phan
(74) *Attorney, Agent, or Firm*—Edell, Shapiro, Finnan & Lytle, LLC (57) ABSTRACT

Range measurements useful for determining a device's position are screened to eliminate unacceptable measurements. A two-stage range measurement screening technique involves a coarse screening stage that includes comparing the range measurement to an estimated expected range and a fine screening stage that includes comparing the range measurement to the computed fading-average range. Range measurements that fall within both coarse and fine screening windows are deemed acceptable and are supplied to a position tracking filter together with their estimated measurement accuracies. Range measurements that do not fall within either the coarse or fine screening window are discarded and do not corrupt the position solution. The accuracies of acceptable range measurements are determined from multiple factors including the measurement offset from a fading-average of previous range measurements and the standard deviation of the previous range measurements.

67 Claims, 3 Drawing Sheets

FIG.1

TOA OPERATIONAL SETUP

METHODS AND APPARATUS FOR ESTIMATING ACCURACY OF MEASUREMENT SIGNALS

BACKGROUND OF THE INVENTION

1. Field of the Invention

The present invention relates to methods and apparatus for estimating the accuracy of measurement signals and, more particularly, to techniques for preventing use of spurious or low-quality range measurement signals in determining an object's position and for estimating the accuracy of acceptable range measurement signals based on measurement history information and operational parameters.

2. Description of the Related Art

Tracking filters are commonly used in a variety of contexts to estimate the present state of an entity by processing raw measurements relating to the entity. For example, the relative or absolute position of an object can be determined by taking measurements, such as series of range measurements, that indicate position. Typically, such measurements have some degree of inaccuracy due to the presence of noise or interference which introduces errors in the measurement values. By tracking the position of the object over time, a tracking filter essentially reduces the uncertainty caused by measurement noise and develops a more accurate estimate of the object's position than would be possible from simply assuming that each measurement accurately reflects the object's true position.

Minimal means-square-error (MSE) filters, such as the well-known Kalman filter, attempt to minimize errors in the tracked position of an object by appropriately weighting the impact of each measurement as a function of the reported accuracy of the measurement. When a new measurement is received, the filter predicts the position of the object at the present time by extrapolating from the previously estimated state of the object. The filter also estimates the accuracy of the predicted current position. The accuracy of the measured position is conventionally determined as a function of the received signal-to-noise ratio (or the signal-to-interference ratio where significant interference is present in addition to noise), with a higher signal-to-noise ratio translating into a higher measurement accuracy. To update the state of the object (e.g., the estimated position and velocity in three dimensions) with the new measurement, the filter must decide the relative extent to which it trusts the predicted current position and the new measurement. If the accuracy of the measurement is high relative to the accuracy of the predicted position, the filter will incorporate the measurement into the position solution using a high filter gain, meaning that the updated position estimate will rely more heavily on the measurement than on the predicted position. Conversely, if the accuracy of the measurement is low relative to the accuracy of the predicted position, the filter will incorporate the measurement into the position solution using a low filter gain, meaning that the updated position estimate will rely more heavily on the predicted position than on the measurement, such that the measurement will have less impact on the position estimate generated by the tracking filter.

Although the signal-to-noise ratio is conventionally relied upon to gauge the accuracy of position measurements in the filter updating process, there are circumstances in which the signal-to-noise ratio alone may not fully reflect the accuracy of the measurement or the extent to which the tracking filter should rely on the measurement. In the case of measuring the range to an object or another device, a precise determination of the signal propagation time between the devices must be made. The signal propagation time can be derived by knowing the transmission and reception times of one or more ranging signals traveling along a direct path between the devices.

For example, the well-known global positioning system (GPS) relies on measurement of the one-way propagation time of signals sent from each of a set of satellites to a receiving device in order to determine the range to each satellite and the position of the receiving device. Position location systems that relies on a two-way, round-trip ranging signal scheme are described in U.S. patent application Ser. No. 09/365,702, filed Aug. 2, 1999, entitled "Method and Apparatus for Determining the Position of a Mobile Communication Device Using Low Accuracy Clocks" and U.S. patent application Ser. No. 09/777,625 filed Feb. 6, 2001, entitled "Methods and Apparatus for Determining the Position of a Mobile Communication Device", the disclosures of which are incorporated herein by reference in their entireties. In the ranging schemes described in these applications, a master mobile communication device transmits outbound ranging signals to plural reference communication devices which respond by transmitting reply ranging signals that indicate the location of the reference radio and the signal turn around time (i.e., the time between reception of the outbound ranging signal and transmission of the reply ranging signal). Upon reception of the reply ranging pulse, the master radio determines the signal propagation time, and hence range, by subtracting the turn around time and internal processing delays from the elapsed time between transmission of the outbound ranging pulse and the time of arrival of the reply ranging pulse. The accuracy of the position determined by these systems depends largely on the accuracy with which the receiving devices can determine the time of arrival of the ranging signals traveling along a direct path between the devices.

In an environment where multipath interference is significant, it is possible to mistakenly identify a strong multipath signal as the direct path signal. Since a multipath signal travels along an indirect path between the transmitter and receiver, the signal propagation time and, hence, the observed range differ from that of the direct path. In a position determining system relying on precise measurements of direct-path signal propagation time to determine range, erroneously interpreting a multipath signal as the direct path signal can drastically degrade performance. In particular, a multipath signal may result in a severely erroneous range measurement; nevertheless, if the multipath signal has a relatively high signal-to-noise ratio, the erroneous range measurement will be reported to the tracking filter as being highly accurate. Consequently, the filter will be misled into placing a high degree of reliance on a severely erroneous range measurement, thereby degrading the accuracy of the position estimate without the degraded accuracy being immediately known or reported.

As described in the aforementioned patent applications, one approach to avoiding the problem of accuracy degradation caused by multipath signals is to use frequency diversity to find a transmission frequency and phase that minimize multipath interference. A rake filter or equalizer can also be employed to separately identify the direct path signal and prominent multipath signals in order to separate or constructively combine these signals. Nevertheless, even with technique such as these, it is possible to measure range with a significant error that is not correctly represented by the signal-to-noise ratio of the ranging signal from which the range measurement is derived.

Even where the signal-to-noise ratio can be trusted as a indicator of measurement accuracy, there may be other measurement information available to supplement the signal-to-noise ratio in estimating the measurement accuracy. For example, the receiving device may have knowledge of the severity of multipath interference and the precision with which the signal arrival time is determined, and the history of recent measurements may suggest the extent to which the latest measurement should be relied upon. Failure to account for such factors in reporting the accuracy of the measurement to a tracking filter may result in a less accurate estimate of position. Accordingly, there remains a need to identify and prevent the use of spurious or unacceptably low accuracy measurements in systems that perform position estimation from measurement signals as well as a need for a better approach to estimating the accuracy of measurement signals supplied to a tracking filter that determines position.

The improved accuracy in position determination that would result from elimination of erroneous measurements would be of great benefit in a variety of applications. In a military context, it is desirable to know the location of military personnel and/or equipment during coordination of field operations and rescue missions. More generally, appropriately equipped mobile communication devices could be used to more accurately track the position of personnel and resources located both indoors or outdoors, including but not limited to: police engaged in tactical operations; firefighters located near or within a burning building or forest fire; medical personnel and equipment in a medical facility or en route to an emergency scene, including doctors, nurses, paramedics and ambulances; and personnel involved in search and rescue operations. A more accurate position location system would enhance capabilities to track and locate high-value items, including such items as personal computers, laptop computers, portable electronic devices, luggage, briefcases, valuable inventory, and automobiles. In urban environments, where conventional position determining systems have more difficulty operating, it would be desirable to more reliably track fleets of commercial or industrial vehicles, including trucks, buses and rental vehicles. Tracking of people carrying a mobile communication device is also desirable in a number of contexts, including, but not limited to: children in a crowded environment such as a mall, amusement park or tourist attraction; location of personnel within a building; and location of prisoners in a detention facility. The capability to accurately determine the position of a mobile communication device also has application in locating the position of next-generation cellular telephones. The capability to determine the position of cellular telephones could be used to pinpoint the position from which an emergency call has been made. Such information could also be used to assist in cell network management (for example, by factoring each mobile communication device's position into message routing algorithms).

SUMMARY OF THE INVENTION

Therefore, in light of the above, and for other reasons that become apparent when the invention is fully described, an object of the present invention is to improve the accuracy of the estimated state of a tracked entity, such as the estimated position of an object or a mobile communication device.

More particularly, it is object of the present invention to accurately determine the three-dimensional position of a mobile communication device in a variety of environments, including urban areas and inside buildings where multipath interference can be great.

Another object of the present invention is to identify and prevent the use of spurious or low-accuracy measurement signals in updating the state of an entity being tracked, such as the position of an object, even when the signal-to-noise ratio of the measurement signals erroneously suggests an acceptable degree of measurement accuracy.

A further object of the present invention is to minimize the effects of interference caused by multipath signal propagation in a position location system, thereby providing highly accurate three-dimensional position estimates even under severe multipath conditions.

Yet another object of the present invention is to account for a variety of measurement and operational information, in addition to or in place of signal-to-noise ratio, in order to report a more refined estimate the accuracy of measurement signals to a tracking filter.

The aforesaid objects are achieved individually and in combination, and it is not intended that the present invention be construed as requiring two or more of the objects to be combined unless expressly required by the claims attached hereto.

In accordance with the present invention, range measurements useful for determining an object's position are screened and evaluated so that only acceptable range measurement are supplied to a tracking filter and used to update the position solution. Range measurements deemed to be unacceptable are identified by the screening process and discarded before the erroneous range measurements can corrupt or degrade the position solution.

In an exemplary embodiment, the range measurement screening process is a two-stage screening technique involving a coarse screening stage and a fine screening stage. The coarse screening stage includes computing an estimated expected range between the reference radio which sent the measured ranging signal and the local receiving radio based on the positions of the reference and local radios estimated by their respective tracking (Kalman) filters. A coarse screening window centered about the estimated expected range is computed as a function of the estimated accuracies of the estimated positions of the reference and local radios.

If the range measurement falls outside the coarse screening window, the range measurement is declared too inaccurate for use in the tracking filter and is not used to update the position solution. If the range measurement falls within the coarse screening window, the range measurement is next evaluated using a fine screening process. The fine screening process relies on a comparison of the range measurement to a measurement history, specifically, a fading average of previous range measurements and the variability of these previous range measurements. An estimated range used to center the fine screening window is calculated from a fading average of the last N measurements used to update the position solution. The width of the fine screening window is a function of the standard deviation of the last N measurements used to calculate the estimated fading-average range.

If the range measurement falls outside the fine screening window, the range measurement is declared too inaccurate for use and is not used to update the position solution. If the range measurement falls within the fine screening window, an estimate of the range measurement accuracy is developed based on one or more of the following factors: the standard deviation of the last N range measurements; the difference (or "error") between the range measurement and the estimated fading-average range; the number of rake taps used in the receiver; the signal-to-noise ratio of the range measurement; a "quality of fit" metric indicative of measurement timing accuracy; and the variance of the estimated positions of the local and reference radios. These parameters can be used to determine a more refined estimate of the range measurement accuracy than would be possible by relying on the signal-to-noise ratio alone.

For each acceptable range measurement, the estimated range measurement accuracy is supplied along with the range measurement itself to the navigation system Kalman filter. The Kalman filter uses the estimated range measurement accuracy to appropriately weight the impact of the range measurement in updating the position solution. The criteria for acceptability and accuracy is dynamically adjustable so that the screening and accuracy estimation process can be optimized for various operating environments. For example, the measurement acceptability thresholds (i.e., the size of the screening windows) can be dynamically adjusted based upon factors such as the number of measurements available and the variability of the measurements in a particular environment.

The measurement screening and accuracy estimation techniques of the present invention can be used to enhance the accuracy of position determination systems useful in wide variety of applications, including location and/or tracking of people and items such as: military personnel and equipment, emergency personnel and equipment, valuable items, vehicles, mobile telephones, children, prisoners and parolees.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

The following detailed explanations of FIGS. 1–4 and of the preferred embodiments reveal the methods and apparatus of the present invention. In accordance with an exemplary embodiment, the measurement screening and accuracy determination techniques of the present invention are employed to enhance a two-way ranging signal scheme used to determine the location of mobile communication devices, such as the schemes described in the aforementioned U.S. patent applications (Ser. Nos. 09/365,702 and 09/777,625). As will become evident, however, the techniques of the present invention are applicable to other types of position determining systems and, indeed, virtually any system that tracks the state of an entity by filtering noisy measurements of the entity.

Figure 1:
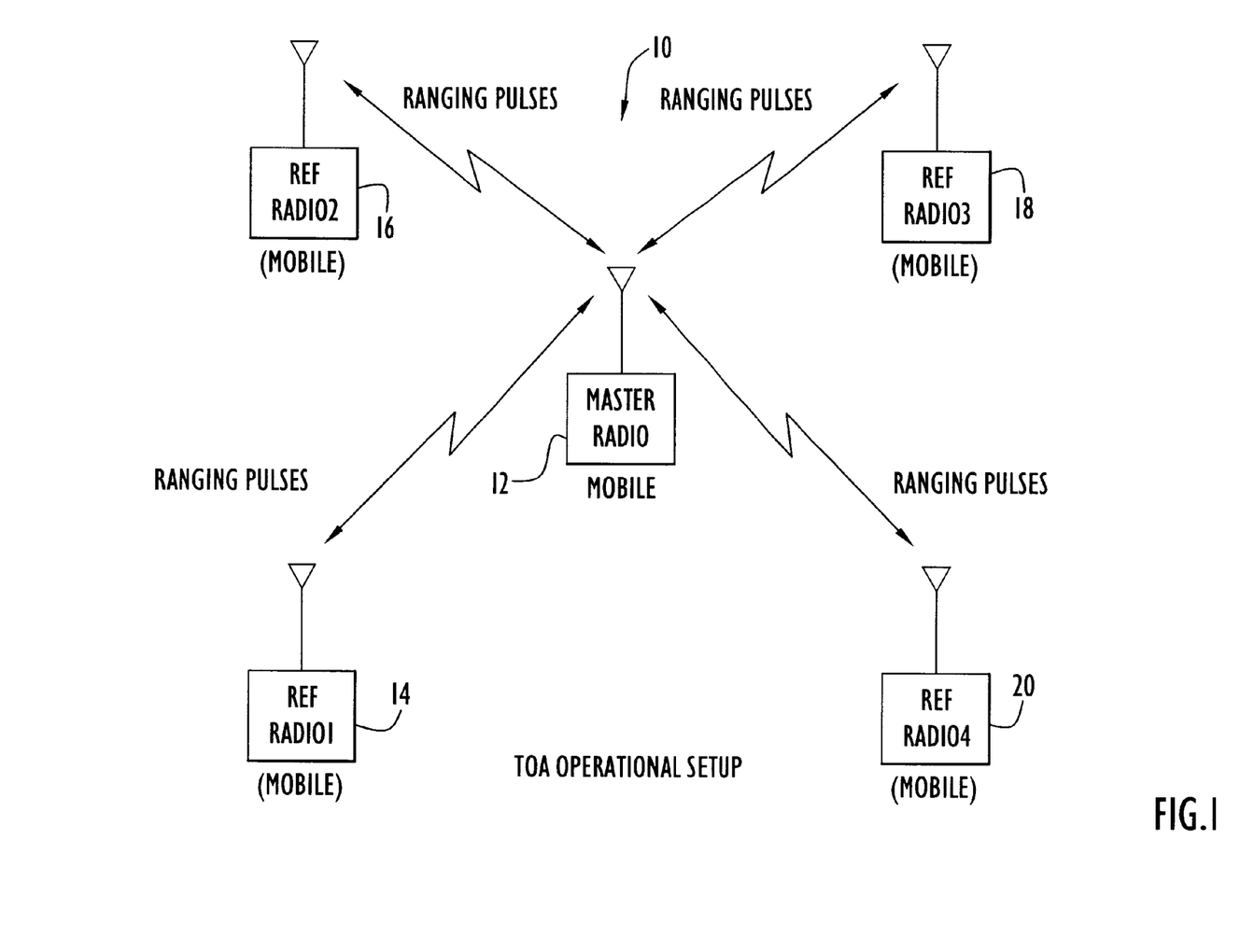
FIG. 1 is a diagrammatic view of the operational setup of a system for determining the position of a mobile communication device in accordance with an exemplary embodiment of the present invention.

Referring to FIG. 1, a position determining system 10 includes a target or "master" mobile communication device or "radio" 12 communicating with four reference communication devices 14, 16, 18 and 20. As used herein and in the claims, a mobile communication device or mobile radio is any portable device capable of transmitting and/or receiving communication signals, including but not limited to: a handheld or body-mounted radio; any type of mobile telephone (e.g., analog cellular, digital cellular or satellite-based); a pager or beeper device; a radio carried on, built into or embedded in a ground-based or airborne vehicle; or any portable electronic device equipped with wireless transmission and reception capabilities, including multimedia terminals capable of transmitting audio, video and data information. Moreover, as used herein and in the claims, a "device" or "radio" includes any device capable of transmitting and/or receiving communication signals, including but not limited to: a handheld or body-mounted radio; any type of mobile telephone (e.g., analog cellular, digital cellular or satellite-based); a pager or beeper device; a radio carried on, built into or embedded in a ground-based or airborne vehicle; or any portable electronic device equipped with wireless reception capabilities, including multimedia terminals capable of receiving audio, video and data information, and any type of position determining receiver. As used herein and in the claim, an "object" can be any device or other entity whose physical position can be ascertained by transmission of signals, whether or not the object cooperates in position determination or is itself capable of transmitting and receiving signals (thus, the term "object" encompasses targets tracked by radar and the like).

Each of reference radios 14, 16, 18 and 20 can be any radio located at a known position that is capable of communicating with the master radio 12 to convey position and range-related information. The reference radios can be any combination of: beacon-like radios fixedly mounted in a known location; mobile radios capable of determining their own positions from others sources, such as from reception of global positioning system (GPS) signals; and other mobile radios similar or identical to the master radio, wherein the reference radio determines its own position in accordance with same two-way ranging technique.

Figure 2:
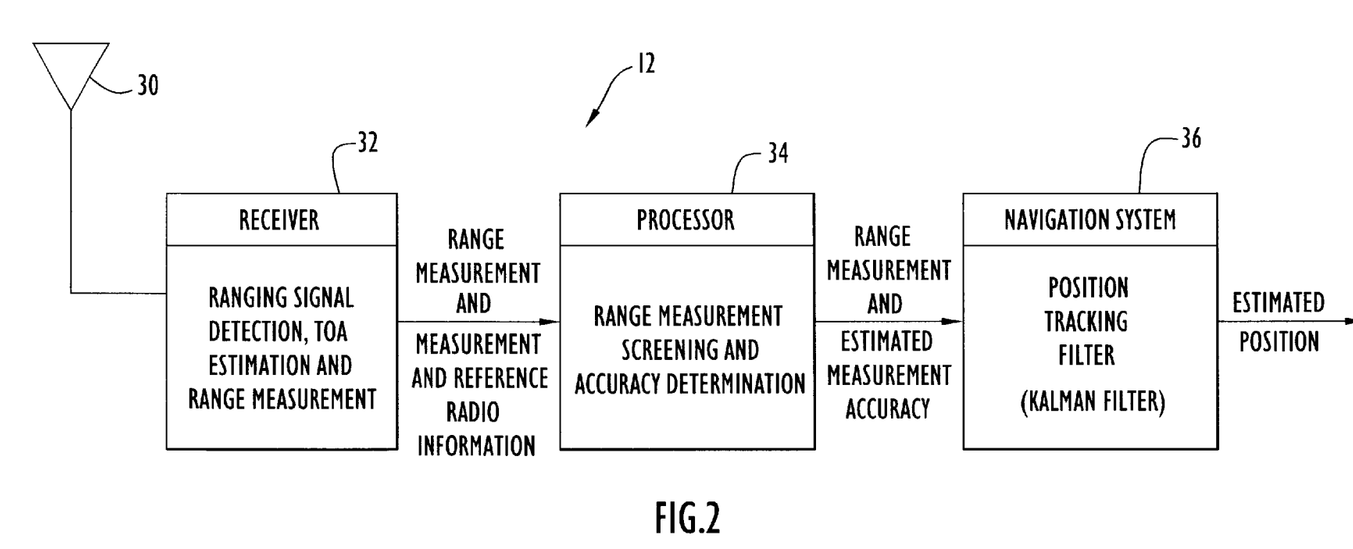
FIG. 2 is a functional block diagram illustrating the portion of a mobile communication device that receives and processes ranging signals in accordance with the exemplary embodiment of the present invention.

A top-level functional block diagram of operations perform by the master radio 12 upon reception of a ranging signal is shown in FIG. 2. Master radio 12 communicates with the four reference radios 14, 16, 18 and 20 to determine its own location in three dimensions. Specifically, master radio 12 and each of reference radios 14, 16, 18 and 20 includes an antenna 30 coupled to a transmitter (not shown) and a receiver 32 for transmitting and receiving ranging pulses. The antenna, transmitter and receiver of each radio may also be used for other communications, such as audio, video and data messages. The time of arrival (TOA) of ranging pulses transmitted between the master and reference radios is used to determine the range to each reference radio, and a conventional trilateration technique is then used to determine from the range measurements the location of the master radio with respect to the reference radios. Each reference radio must know its own position and convey this information to the master radio to enable the master radio to determine its position from the ranging pulses exchanged with the reference radios.

The system of the exemplary embodiment employs a two-way or round-trip ranging message scheme. As seen from the bi-directional arrows in FIG. 1, master radio 12 transmits to each of the reference radios 14, 16, 18 and 20 outbound ranging pulses or "packets" and receives back from each reference radio a reply ranging pulse. For example, master radio 12 sequentially exchanges ranging pulses with each individual reference radio, first exchanging ranging pulses with reference radio 14, then with reference radio 16, etc. By precisely knowing the time of transmission of the outbound ranging pulse, the far-end turn around time at the reference radio, the time of arrival of the reply ranging pulse, and internal transmission/reception processing delays, the master radio can precisely determine the signal propagation time between itself and each reference radio. The one way signal propagation time $T_{TOA}$ can be described as one half of the difference between a) the elapsed time ($T_{RTT}$) between the time of transmission of the outbound ranging pulse and the time of arrival of the reply ranging pulse and b) the turn around time ($T_{TAT}$), or:

$$T_{TOA}=0.5(T_{RTT}-T_{TAT}) \quad (1)$$

Once the two-way signal propagation time is determined, the range is then readily calculated as the velocity of the signal through the propagating medium (e.g., the speed of light through air) multiplied by the one-way propagation time, or $$\text{Range}=C \times T_{TOA} \quad (2)$$

where C is the speed of light ($2.998 \times 10^8$ m/sec). By determining the range to each of four reference radios in this manner, the master radio can determine its own location from these ranges and the known locations of the reference radios using well-known trilateration computations.

The radios of the exemplary embodiment of the present invention must be able to accurately determine the time of transmission and the time of arrival of the ranging pulses in order to accurately measure the range between the radios and to accurately estimate the position of the master radio. A number of techniques can be used for accurately determining the true time of arrival and time of transmission. To minimize processing delay timing errors resulting from asynchronous events that occur within the signal processors of the radios, each radio performs internal delay calibrations in order to accurately estimate the actual internal processor time delays that occur when processing the ranging pulses. The total elapsed time measured by the master radio between transmission of the outbound ranging pulse and reception the reply ranging pulse includes time attributable to propagation of the pulse signals and time attributable to processing delays within the radios. By accurately estimating and subtracting out the time attributable to processing delays, the signal propagation time (and hence the range) can be more accurately determined.

Leading edge curve fitting is used to accurately locate the leading-edge of an acquisition sequence in the ranging pulse in order to reduce the effects of multipath interference on TOA estimates. Essentially, a replica of the ranging waveform's multipath-free correlation function is pre-stored (i.e., the multipath-free pulse shape profile is known). The curve fitting involves moving the pulse shape replica through the profile of the received ranging pulse and performing a least-mean-square error fit to achieve a curve fitting between the replica pulse shape and the received ranging pulse to identify the timing of the direct path signal and subsequent multipath signals (at the time of the direct path signal and the multipath signal, the received signal profile will be similar to the replica profile). A curve fitting timing offset (CF offset) relative to the nearest sample time is determined along with a quality of fit (QOF) metric that estimates the accuracy of the CF offset.

Frequency diversity can also be used to orthogonalize multipath interference with respect to the direct path signal, wherein an optimal carrier frequency and phase is identified and used to estimate the TOA to minimize the impact of multipath interference. Diverse frequencies create diverse carrier phases in multipath. Ranging performance is best when the carrier phase of the multipath is 90° with respect to the direct path. If this orthogonality condition is met, the direct path and multipath are separated such that the direct path can be more precisely curve fit with minimal effects for multipath.

In the case of rapidly moving devices, the Doppler shift of each arriving ranging pulse can be estimated and compensated for in determining the pulse's time of arrival. Using these techniques, the one way signal propagation time or one way time of arrival ($T_{TOA}$) is more precisely determined by:

$$T_{TOA}=0.5(T_{RTT}-T_{dc\ master}-T_{dc\ reference}-T_{TAT\ reference}+\Delta T_{REF\ CF\ offset}+\Delta T_{MAS\ CF\ offset}) \quad (3)$$

where $T_{RTT}$ is the total round trip elapsed time from transmission of an outbound ranging pulse to reception of a corresponding reply ranging pulse, $T_{dc\ master}$ is the internal delay in the master radio (determined from delay calibration), $T_{dc\ reference}$ is the internal delay in the reference radio, $T_{TAT\ reference}$ is the reference radio turnaround time, $\Delta T_{REF\ CF\ offset}$ is a time offset due to curve fitting the ranging packet data at the reference radio, and $T_{MAS\ CF\ offset}$ is a time offset due to curve fitting the ranging packet data at the master radio.

Figure 3:
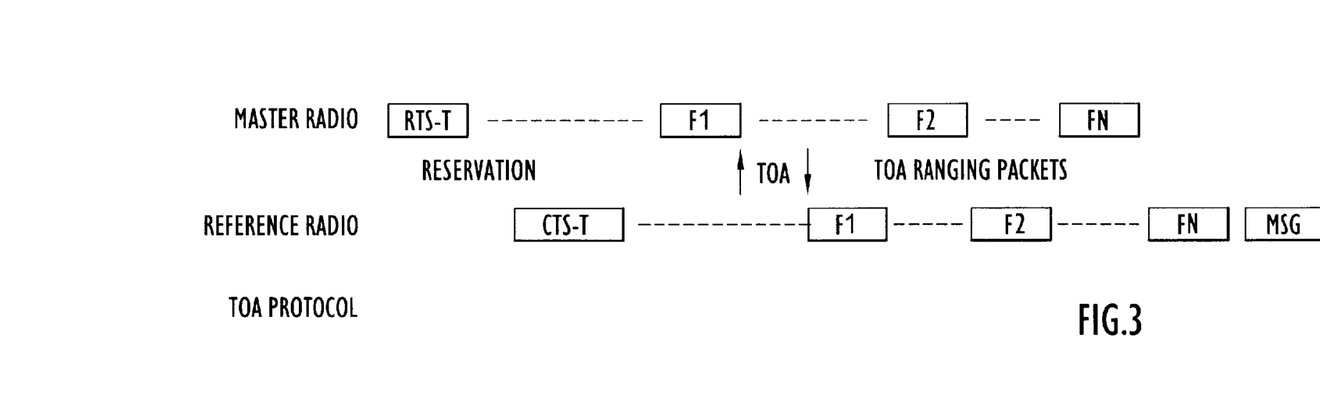
FIG. 3 is a functional flow diagram illustrating the processing performed by the mobile communication device to determine whether a range measurement should be used by the position tracking filter and to estimate the accuracy of acceptable range measurements in accordance with the exemplary embodiment of the present invention.

By way of non-limiting example, the Carrier Sense Multiple Access with Collision Avoidance (CSMA/CA) protocol can be adapted for use as a messaging protocol to transmit the ranging signals required to accurately determine the round-trip signal delay between pairs of mobile communication devices. A TOA ranging protocol for determining the range to a single reference radio is shown in FIG. 3. Like channel reservation in a system employing a CSMA/CA protocol for conventional communications, the master radio initiates the time of arrival (TOA) ranging session by transmitting a channel reservation request message RTS-T requesting access to a communication channel for a period of time required to exchange a sequence of ranging pulses with a particular reference radio (the ranging process is repeated with each reference radio in sequence).

The master radio transmits the RTS-T message to prompt a particular reference radio to perform internal delay calibration (if necessary) and to initiate an exchange of ranging signals. If frequency diversity is being used, the radios exchange a sequence of N pairs of ranging signals at multiple transmission frequencies, as shown in FIG. 3. Upon receiving the RTS-T message, if the requested channel is available, the reference radio transmits a reply reservation message (CTS-T) back to the master radio indicating that the channel is available and the reference radio is ready to exchange ranging pulses with the master radio, thereby completing the reservation for ranging.

Once the master radio and reference radio have exchanged the RTS-T and CTS-T messages and, if necessary, performed delay calibration, the master radio and reference radio exchange the ranging signals at a single frequency. In benign environments, it may be necessary to exchange only a single set of ranging signals. In environments with severe multipath or other interference, frequency diversity can be used by exchanging a sequence of ranging pulses in rapid succession, with each set of exchanged pulses being transmitted at a different carrier frequency. Diverse frequencies create diverse carrier phases in multipath. Ranging performance is best when the carrier phase of the multipath is 90° with respect to the direct path. If this orthogonality condition is met, the direct path and multipath are separated such that the time of arrival of the direct path pulse can be more precisely determined by curve fitting with minimal effects from multipath. The multiple transmission carrier frequencies can be referred to as "ping" frequencies and the ranging pulses can be referred to as "TOA pings", since a rapid succession of M different frequency pulses or multiple "pings" are transmitted between the radios in search of an optimal frequency.

Referring again to FIG. 3, in the case where frequency diversity is used, the master radio transmits a first outbound ranging pulse or TOA ping using a first transmission frequency F1. The reference radio receives the first outbound ranging pulse and transmits a first reply ranging pulse to the master radio at the first transmission frequency F1. This process is repeated until ranging pulses have been exchanged for each of N frequencies. In this manner, the N sets of ranging pulses are transmitted at N different carrier frequencies. After all N sets of ranging pulses have been exchanged, the reference radio precisely determines the time of arrival of the ranging pulses and sends a final message packet (MSG) to the master radio (see FIG. 3).

The MSG packet, transmitted from the reference radio to the master radio contains the following data: reference radio delay calibration ($T_{dc\ reference}$); curve fit offset due to curve fitting the ranging packet data at the reference radio ($T_{REF\ CF\ offset}$); the best carrier frequency found by the reference radio (the carrier frequency at which the multipath error is most orthogonal); an estimate of the accuracy of the TOA estimate from curve fitting (quality of fit (QOF)); the reference radio position and position accuracy (e.g., latitude, longitude, altitude, and spherical position standard deviation); the reference radio velocity and velocity accuracy (e.g., east, north, up and spherical velocity standard deviation); noise information; power and data rate control information; and error correction code information. Of course, it will be understood that the messaging scheme employed by the present invention is not limited to any particular protocol, and any suitable message or signal structure that permits measurement of range can be used.

The master radio uses the CF offset, QOF and delay calibration from the reference radio at the frequency determined by the master radio to provide the best QOF, along with the total round trip time (RTT), the estimated CF offset of the reference-to-master radio ranging signal acquisition detection, and the master radio delay calibration to compute the final TOA and range estimates in accordance with equations (3) and (2).

Once the ranging sequence is completed with one reference radio, the processes is repeated with another reference radio. The master radio determines its own position from the measured range to each of the reference radios via a trilateration technique which can be for example, a conventional trilateration technique.

Figure 4:
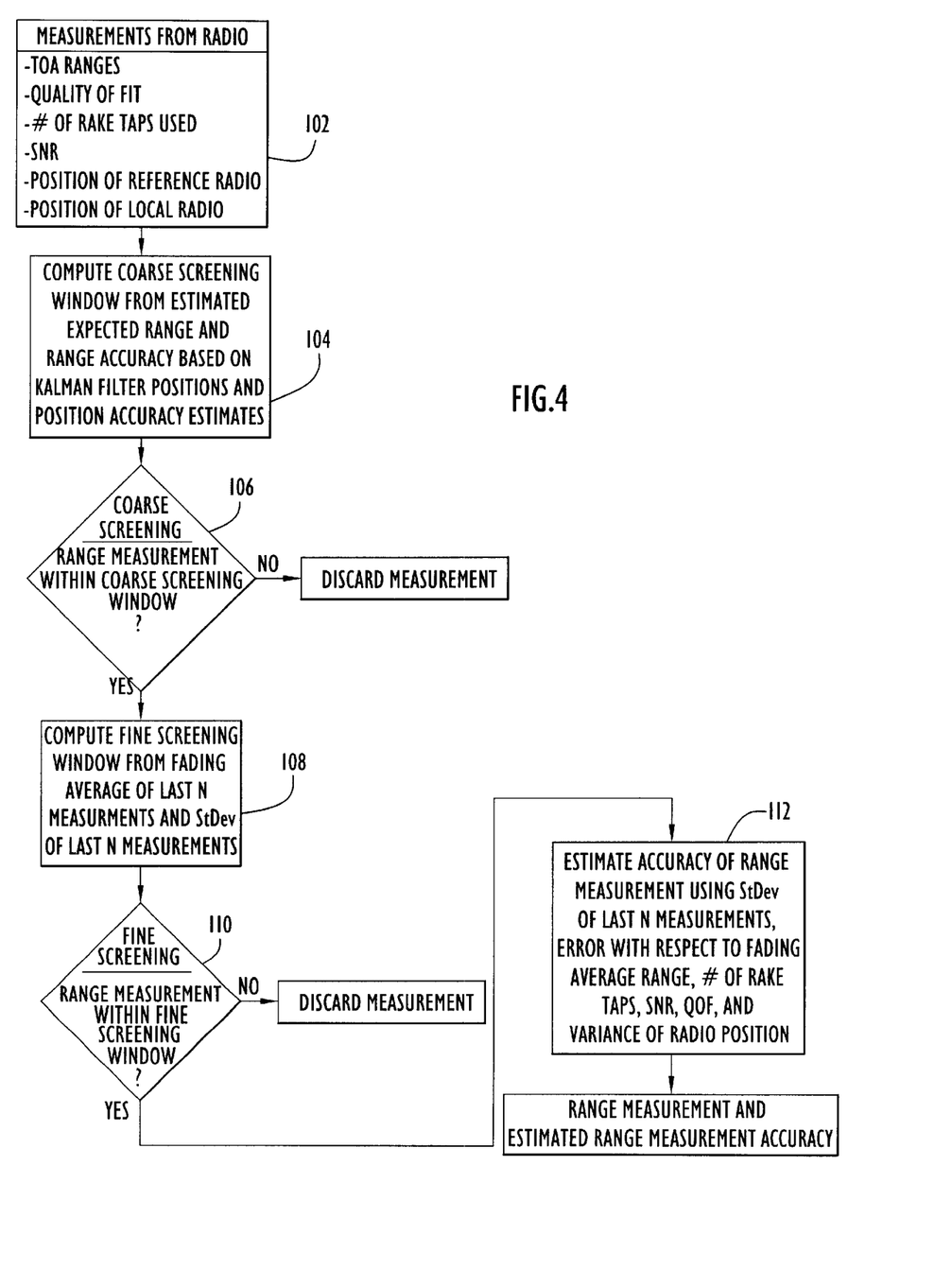
FIG. 4 illustrates a ranging pulse exchange sequence performed by the master radio and a reference radio during a ranging session in accordance with the exemplary embodiment of the present invention.

Referring again to FIG. 2, once the master radio receiver 32 has generated a range measurement, the range measurement is supplied to a processor 34 for screening the range measurement and determining the accuracy of the range measurement to be reported to a tracking filter 36 in accordance with the present invention. A detailed flow diagram illustrating the measurement analysis processing performed by processor 34 for each range measurement detected by receiver 32 is shown in FIG. 4. Processor 34 receives as input the range measurement (TOA Range), the quality of fit of the TOA estimate, the signal-to-noise ratio of the range measurement, the estimated position of the reference radio from which the range signal was received, the estimated position of the receiving master radio itself (i.e., the "local" radio), and the estimated accuracies of the reference and local radio positions (see step 102, FIG. 4). Since the reference radio transmits the quality of fit metric for the outbound ranging signal to the local radio in the final message (see FIG. 3), the quality of fit of both the outbound and reply ranging signals can be supplied to processor 34. Likewise, the estimated position and position accuracy of the reference radio (which are determined by the reference radio's Kalman filter) are supplied to the local radio in the final message of the ranging sequence. The local radio's estimated position and position accuracy are available from the navigation system 36 of the local radio as outputs of the local Kalman filter. Where the receiver 32 includes a rake filter for resolving the direct path and multipath signals, the number of rake taps used can also be supplied to processor 34. The number of rake taps used is indicative of the extent of the multipath interference.

In accordance with the exemplary embodiment, the range measurement screening process includes a two-stage screening technique involving a coarse screening stage and a fine screening stage. It should be understood, however, that the present invention is not limited to a two-stage screening approach, and any number of screening schemes can be employed.

Referring again to FIG. 4, in step 104, the coarse screening stage involves computing an estimated expected range between the reference radio and the local (master) radio from the positions of the reference and local radios estimated by their respective Kalman filters. The most accurate a priori information about the positions of the reference and local radios comes from the position solutions determined by the respective reference and local radio Kalman filters. Thus, comparison of the received range measurement to the estimated "expected" or "predicted" range computed from these position solutions provides a reliable basis for evaluating whether the received range measurement is grossly erroneous.

A coarse screening window centered about the estimated expected range is computed as a function of the estimated accuracies of the estimated positions of the reference and local radios. By way of non-limiting example, the width of the coarse window can be set to the sum of the local and reference radio estimated position accuracies multiplied by an appropriate constant:

Coarse Window Lower Bound=Estimated Range$-C*(\sigma_{position\ reference}+\sigma_{position\ local})$ (4)

Coarse Window Upper Bound=Estimated Range$+C*(\sigma_{position\ reference}+\sigma_{position\ local})$ (5)

or simply:

Coarse Screening Window=Estimated Range$\pm C\times(\sigma_{position\ reference}+\sigma_{position\ local})$ (6)

where $\sigma_{position\ reference}$ is the position standard deviation of the reference radio (e.g., the estimated horizontal position accuracy), $\sigma_{position\ local}$ is the position standard deviation of the local radio, and C is a positive constant. As shown in step 106, if the range measurement falls outside the coarse screening window, the range measurement is declared too inaccurate for use and is completely discarded, meaning that the range measurement is not passed on to the navigation system 36 and is not used by the Kalman filter to update the position solution.

In general, the value of the multiplier constant C should be set to a value that causes grossly erroneous range measurements to fall outside the coarse screening window but minimizes the likelihood that a valid, useful range measurement will fall outside the coarse screening window (e.g., some value between one and five). For example, in a harsh environment with severe multipath, the value of C is preferably set such that the coarse screening process screens out detected multipath signals erroneously assumed to be direct path signals, while accepting direct path signals having a modest degree of error caused by noise. Optionally; the value of C or, more generally, the expression for determining the coarse window width, can be varied as a function of the communication environment or operational parameters.

If the range measurement falls within the coarse screening window, the range measurement is next evaluated using a fine screening process. Unlike the coarse screening process, which bases the acceptability of the range measurement on a comparison with filter-derived position and accuracy information, the fine screening process relies on a comparison of the range measurement to a measurement history, namely, a fading average of previous range measurements and the variability of these previous range measurements. Specifically, as shown in step 108 of FIG. 4, an estimated range is calculated from a fading average of the last N measurements used to update the position solution (the new range measurement is not used in this calculation). For example, the fading-average range can be determined by:

$$\text{Estimated Fading-Average Range} = R_{FadAvg} = \left\{\sum_{i=1}^{N} w_i * R_i\right\} / \sum_{i=1}^{N} w_i \quad (7)$$

where $R_i$ is the ith previous range measurement (e.g., $R_1$ is the most recent previous range measurement), and $w_i$ is the weighting placed on the ith range measurement. To effect the fading average, the values of $w_i$ decrease with increasing values of i. For illustrative purposes, suppose: N=3; the last three range measurements are: $R_1$=60 m, $R_2$=50 m, $R_3$=40; and the corresponding weights are: $w_1$=30, $w_2$=15, $w_3$=5. In this case, the estimated fading-average range is computed to be 55 m. Note that the un-weighted average would be 50 m, but the weighted average is much closer to the most recent measurement (60 m) due to the fading average weighting scheme. The number of previous measurements used in the computation of the fading-average range (i.e., the value of N) and the values of the range measurement weights can be set to any suitable values to control the number of previous measurements that will affect the computed fading-average range and the rate and degree to which a measurement's influence on the average fades over time as new measurements are received. For example, N could have a relatively small value, such as three or four, resulting in a rapid fade, or a larger value such as twenty, producing a more gradual fade. Preferably, the value of N is at least six.

Those skilled in the art will recognize that the fading-average range computed in accordance with equation (7) does not attempt to take into account range rate or acceleration as a tracking filter might. If the dynamics of the reference and local radios are such that range estimate offsets due to motion are small relative to the fluctuations in the range measurement values due to measurement inaccuracies, it is preferable not to account for range rate in the fading-average range estimate, since use of range rate may actually degrade the accuracy of the fading-average range estimate. For example, if the radios are relatively slow moving and can drastically change direction very quickly (e.g., a radio held by a person on foot), use of range rate may be undesirable in computing the estimated fading-average range. Conversely, with rapidly moving devices, such as airborne communication devices, which change directions more gradually, consideration of range rate in the fading average range estimate may be of greater value.

The estimated fading-average range is used to center the fine screening window. The width of the fine screening window is a function of the standard deviation of the last N measurements used to calculate the estimated fading-average range. The standard deviation is computed as the statistical standard deviation, relative to the fading-average range, of the last N range measurement values, or:

$$StDev_{Last\ N\ Range\ Measurements} = \left\{\left(\sum_{i=1}^{N}(R_i - R_{Fad\ Avg})^2\right)/(N-1)\right\}^{1/2} \quad (8)$$

where $R_{Fad\ Avg}$ is the estimated fading-average range of the N range measurements computed from equation (7). The fine screening window is then determined by:

$$\text{Fine Screening Window} = R_{Fad\ Avg} \pm (D \times StDev_{Last\ N\ Range\ Measurements}) \quad (9)$$

where D is a positive constant. As shown in step 110, if the range measurement falls outside the fine screening window, the range measurement is declared too inaccurate for use and is completely discarded, meaning that the range measurement is not passed on to the navigation system 36 and is not used by the Kalman filter to update the position solution.

The value of the multiplier constant D should be set to a value that causes range measurements that deviate from the estimated fading-average range to a much greater extent than the previous N measurement to fall outside the fine screening window, but causes range measurements whose deviations from the estimated fading-average range are in line with those of previous measurements to fall within the fine screening window. By way of non-limiting example, D could have a value of three or four. The appropriate value for D may depend on the harshness of operating environment, and different values for D may be suitable under different conditions, depending on such factors as the extent of signal attenuation, multipath interference and other interference. Optionally, the value of D can varying depending upon the operational environment and operational parameters, such that the degree of signal attenuation and multipath interference or other interference.

If the range measurement falls within the fine screening window, an estimate of the accuracy of the range measurement is developed based on a number of factors (step 112). The estimated range measurement accuracy is supplied along with the range measurement itself to the navigation system Kalman tracking filter. The Kalman filter uses the estimated range measurement accuracy to determine the extent to which the range measurement should be relied upon in updating the position solution. A range measurement deemed to be highly accurate relative to the accuracy of the predicted position solution will cause the Kalman filter to rely more heavily on the range measurement in updating the position solution. Conversely, a range measurement deemed to have a low accuracy relative to the accuracy of the predicted position solution will cause the Kalman filter to rely less heavily on the range measurement in updating the position solution.

Conventionally, the accuracy of a measurement reported to a tracking filter is determined as a function of the signal-to-noise ratio of the measurement. However, as previously explained, the signal-to-noise ratio may not accurately reflect the measurement accuracy in all circumstances. Even where the signal-to-noise ratio is reliable, additional information may be available to develop a more refined estimate of the measurement accuracy. In accordance with the present invention, an estimate of the range measurement accuracy is based on one or more of the following factors: the standard deviation of the last N range measurements; the difference between the range measurement and the estimated fading-average range (i.e., the measurement offset from the fading average range); the number of rake taps used in the receiver; the signal-to-noise ratio of the range measurement; the aforementioned quality of fit metric; and the variance of the positions of the radios as estimated by their respective Kalman filters (e.g., the estimated horizontal position accuracy from both radios).

More specifically, one metric for determining the reported range measurement accuracy can be computed from the range measurement offset from the fading-average range normalized as a function of the standard deviation of the last N range measurements. The smaller the normalized difference is between the range measurement and the estimated fading-average range, the greater is the reported accuracy. The function used to normalize the range measurement offset is preferably based on the standard deviation of the last N range measurements, and any appropriate standard-deviation-based normalization functions can be employed to report suitable measurement accuracy estimates to the Kalman filter. More generally, the present invention encompasses any measurement accuracy estimate based upon the standard deviation of previous measurements and the difference between the measurement and the fading average of the previous measurements.

Other measurement and operational information can be used to adjust the estimated range measurement accuracy. For example, if the quality of fit metric indicates a good curve fit was made with the range measurement, the estimated range measurement accuracy can be adjusted to reflect greater accuracy (and, conversely, a poor curve fit translates into lower estimated measurement accuracy). If the number of rake taps used is relatively high, indicating the presence of significant multipath interference, the estimated range measurement accuracy can be adjusted to reflect lower accuracy. If the signal-to-noise ratio is relatively high, the estimated range measurement accuracy can be adjusted to reflect greater accuracy. Likewise, the estimated range measurement accuracy can be adjusted in accordance with the Kalman-estimated variances of the radios' positions (note that this is different from setting the gain within the Kalman filter, which depends on the relative variances of the reported measurement and the radios' positions). With each of the aforementioned parameters, the estimated range measurement accuracy can be adjusted up or down as a function of the value of the parameter.

Referring again to FIG. 2, the range measurement and estimated range measurement accuracy are supplied by processor 34 to navigation system which tracks the position solution of the master radio using, for example, Kalman filtering techniques. While the tracking filter described in the exemplary embodiment is a Kalman filter, in general, the tracking filter need not be a Kalman filter and can be any tracking filter which utilizes measurement and measurement accuracy information to track an entity.

Upon receiving similar range and range accuracy measurements from plural reference radios, the navigation system of the local radio determines its measured position from the measured range to each of the reference radios via a trilateration technique which can be, for example, a conventional trilateration technique. The Kalman filter then updates the position solution of the radio as a function of the estimated predicted filter position and the measured position. The extent to which the range measurements influence the updated position solution depends upon the estimated accuracy of the range measurements, with greater accuracy resulting in higher filter gains and correspondingly greater impact on the position solution. Once the local radio's position has been determined by the Kalman filter, the local radio can convey this information to other radios or to a controller or coordinator performing tracking and/or mapping of the master radio and perhaps other associated mobile radios. The ranging/position location processing can be performed periodically or initiated by the local radio or a system controller as needed. As will be appreciated from the foregoing, by pre-screening and rejecting unacceptable range measurements and by determining more refined estimates of range measurement accuracy, the techniques of the present invention substantially improve the accuracy of the position estimate generated by the tracking filter and greatly enhance the overall capability of the position determining system. In particular, the present invention prevents multipath interference from corrupting a device's tracked position solution by identifying erroneously detected multipath signals and preventing such signals from being used to update the position solution.

The described measurement screening technique involves a coarse screening process based a range measurement comparison with predicted position information and a fine screening process based on a range measurement comparison with a measurement history information. Although the combination of these screening processes provides superior performance in certain contexts, if acceptable performance can be achieved, the present invention encompasses using a single screening process (e.g., screening involving only comparisons of range measurements to predicted position information or only comparisons of range measurements to measurement history information).

The exemplary embodiment of the present invention includes both screening unacceptable measurements and determining the accuracy of the acceptable measurements. While this combination of techniques is particularly advantageous, the measurement screening techniques and the accuracy determination techniques of the present invention can be used separately and independently.

While the measurement screening and accuracy determination techniques of the present invention have been described in the context of a system receiving and processing range measurement, it will be understood that the invention applies equally in systems that handle other types of position-revealing signals. For example, the principles of the invention apply in systems that receive measurements which indicate the relative angle of an object (e.g., azimuth and elevation). In this case, the methodology is used to determined whether angular measurements are acceptable and to estimate accuracies of acceptable angular measurements.

Further, the techniques of the present invention can be employed in virtually any type of position determining system, including GPS receivers and even non-cooperative-target systems, such as radar and electronic warfare systems. In fact, the underlying principles of the present invention (i.e., the pre-screening of a noisy measurement based upon a distance metric from an expected value and the above-described accuracy estimation techniques) are applicable to systems other than position determining systems where measurements are supplied to a tracking filter and the signal-to-noise ratio of the measurements may not be representative of the measurement accuracy.

The hardware required to implement the system of the present invention easily fits within the physical footprint of a handheld spread spectrum radio, permitting the system to be used in a wide variety of applications, including virtually any application which uses radio ranging techniques for position determination. For example, to provide situation awareness in military exercises, the system of the present invention can be used to more accurately track the position of military personnel and/or equipment during coordination of field operations. The system of the present invention can also be used to enhance tracking of non-military personnel and resources located both indoors or outdoors, including but not limited to: police engaged in tactical operations; firefighters located near or within a burning building or forest fire; medical personnel and equipment in a medical facility or en route to an emergency scene; and personnel involved in search and rescue operations.

The system of the present invention can also be used to improve tracking of high-value items by tagging items or embedding a mobile radio in items such as personal computers, laptop computers, portable electronic devices, luggage (e.g., for location within an airport), briefcases, valuable inventory, and automobiles.

In urban environments, where conventional position determining systems have more difficulty operating, the system of the present invention greatly increases the capability to reliably track fleets of commercial or industrial vehicles, including trucks, buses and rental vehicles equipped with mobile radios. Tracking of people carrying a mobile communication device is also desirable in a number of contexts, including, but not limited to: children in a crowded environment such as a mall, amusement park or tourist attraction; location of personnel within a building; and location of prisoners in a detention facility. The mobile device could be carried on the body by incorporating the radio into clothing, such as a bracelet, a necklace, a pocket or the sole of a shoe.

The measurement screening and accuracy estimation techniques of the present invention also have the application in improving the capability to locate the position of cellular telephones. By incorporating the techniques of the present invention into a position determination system within a mobile telephone, the position of the telephone can be determined when an emergency call is made or at any other useful time. This capability could also be used to assist in cell network management (e.g., in cell handoff decisions).

Having described preferred embodiments of new and improved methods and apparatus for estimating accuracy of measurement signals, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of determining whether a measurement is acceptable for use in a tracking system, the method comprising:
   (a) determining a measurement value from a detected signal;
   (b) computing an average and standard deviation of previous acceptable measurements;
   (c) generating a window of acceptability as a function of the average and standard deviation of the previous acceptable measurements; and
   (d) if the measurement value is within the window of acceptability, supplying the measurement value to the tracking system for updating a state tracked by the tracking system.

2. The method of claim 1, wherein the average is a fading average of previous acceptable measurements, wherein more recent measurements are weighted more heavily in determining the fading average.

3. The method of claim 1, wherein the measurement value is a range measurement and the tracking system determines the position of an object from a plurality of range measurements.

4. The method of claim 3, wherein:
   the measurement value represents a range between a mobile communication device and a reference communication device determined from a round-trip signal propagation time of ranging signals exchanged between the mobile communication device and the reference communication device.

5. The method of claim 1, further comprising:
   (e) calculating an error between the measurement and the average of the previous acceptable measurements;
   (f) determining the accuracy of the measurement value as a function of the error between the measurement and the average of the previous acceptable measurements and the standard deviation of the previous acceptable measurements; and
   (g) supplying the accuracy to the tracking system for updating the state tracked by the tracking system.

6. The method of claim 5, wherein the detected signal is detected using a rake filter, and wherein (f) further includes determining the accuracy of the measurement value as a function of a number of rake taps used by the rake filter in detecting the signal.

7. The method of claim 5, wherein detecting the detected signal includes curve fitting the detected signal to a stored signal replica, and wherein (f) further includes determining the accuracy of the measurement value as a function of a quality of fit of the curve fitting.

8. The method of claim 5, wherein (f) further includes determining the accuracy of the measurement value as a function of a signal-to-noise ratio of the detected signal.

9. The method of claim 5, wherein the measurement value is a range measurement of a range between a mobile communication device and a reference communication device and the tracking system estimates the position of the mobile communication device from a plurality of range measurements, the method further comprising:
   (h) computing a predicted range between the mobile communication device and the reference communication device based on tracked positions of the mobile communication device and the reference communication device; and
   (i) estimating the accuracy of the predicted range based on estimated accuracies of the tracked positions of the reference communication device and the mobile communication device;

wherein (f) further includes determining the accuracy of the range measurement as a function of the estimated accuracy of the predicted range.

10. The method of claim 1, wherein the measurement value is a range measurement of a range between a mobile communication device and a reference communication device and the tracking system estimates the position of the mobile communication device from a plurality of range measurements, the method further comprising:

(e) computing a predicted range between the mobile communication device and the reference communication device based on tracked positions of the mobile communication device and the reference communication device;

(f) estimating the accuracy of the predicted range based on estimated accuracies of the tracked positions of the reference communication device and the mobile communication device;

(g) generating a coarse window of acceptability as a function of the predicted range and the estimated accuracy of the predicted range;

(h) supplying the range measurement to the tracking system for updating the estimated position of the mobile communication device if the range measurement is within said coarse window of acceptability and said window of acceptability.

11. A method of determining whether a range measurement is acceptable for use in updating an estimated position of a mobile communication device, comprising:

(a) measuring a range between the mobile communication device and a reference communication device;

(b) computing a predicted range between the mobile communication device and the reference communication device based on tracked positions of the mobile communication device and the reference communication device;

(c) estimating the accuracy of the predicted range based on estimated accuracies of the tracked positions of the reference communication device and the mobile communication device;

(d) generating a first window of acceptability as a function of the predicted range and the estimated accuracy of the predicted range;

(e) computing an average and standard deviation of previous range measurements;

(f) generating a second window of acceptability as a function of the average and standard deviation of the previous measurements;

(g) if the range measurement is within both the first and second windows of acceptability, supplying the range measurement to a tracking system for updating the estimated position of the mobile communication device.

12. The method of claim 11, wherein the average is a fading average of previous range measurements, wherein more recent range measurements are weighted more heavily in determining the fading average.

13. The method of claim 11, wherein the range measurement is determined from a round-trip signal propagation time of ranging signals exchanged between the mobile communication device and the reference communication device.

14. The method of claim 11, further comprising:

(h) calculating an error between the range measurement and the average of the previous range measurements;

(i) determining the accuracy of the range measurement as a function of the error between the range measurement and the average of the previous range measurements and the standard deviation of the previous range measurements; and (j) supplying the accuracy to the tracking system for updating the estimated position of the mobile communication device.

15. The method of claim 14, wherein the range measurement is detected using a rake filter, and wherein (i) further includes determining the accuracy of the range measurement as a function of a number of rake taps used by the rake filter in detecting the range measurement.

16. The method of claim 14, wherein measuring the range includes curve fitting the detected signal to a stored signal replica, and wherein (i) further includes determining the accuracy of the range measurement as a function of a quality of fit of the curve fitting.

17. The method of claim 14, wherein (i) further includes determining the accuracy of the range measurement as a function of a signal-to-noise ratio of the range measurement.

18. The method of claim 5, wherein (i) further includes determining the accuracy of the range measurement as a function of the estimated accuracy of the predicted range.

19. A method of estimating the accuracy of a measurement to be used in a tracking system, the method comprising:

(a) determining a measurement value from a detected signal;

(a) computing an average and standard deviation of previous measurements;

(b) calculating an error between the measurement value and the average of the previous measurements;

(c) determining the accuracy of the measurement value as a function of the error and the standard deviation of the previous measurements; and (d) supplying the measurement value and the accuracy to the tracking system for updating a state tracked by the tracking system.

20. The method of claim 19, wherein the detected signal is detected using a rake filter, and wherein (c) further includes determining the accuracy of the measurement value as a function of a number of rake taps used by the rake filter in detecting the signal.

21. The method of claim 19, wherein detecting the detected signal includes curve fitting the signal to a stored signal replica, and wherein (c) further includes determining the accuracy of the measurement value as a function of a quality of fit of the curve fitting.

22. The method of claim 19, wherein (c) further includes determining the accuracy of the measurement value as a function of a signal-to-noise ratio of the detected signal.

23. The method of claim 19, wherein the measurement value is a range measurement of a range between a mobile communication device and a reference communication device and the tracking system estimates the position of the mobile communication device from a plurality of range measurements, the method further comprising:

(e) computing a predicted range between the mobile communication device and the reference communication device based on tracked positions of the mobile communication device and the reference communication device; and (f) estimating the accuracy of the predicted range based on estimated accuracies of the tracked positions of the reference communication device and the mobile communication device;

wherein (c) further includes determining the accuracy of the measurement value as a function of the estimated accuracy of the predicted range.

24. The method claim 19, wherein the average is a fading average of previous measurements, wherein more recent measurements are weighted more heavily in determining the fading average.

25. A mobile communication device capable of estimating its position by determining ranges to a plurality of reference communication devices having known positions, comprising:

a receiver configured to receive ranging signals from reference communication devices, said receiver generating a range measurement from a detected ranging signal;

a processor configured to receive the range measurement, said processor generating a window of acceptability as a function of an average and a standard deviation of previous range measurements and finding the range measurement to be acceptable if the range measurement is within the window of acceptability; and a tracking system configured to receive acceptable range measurements from said processor, said tracking system updating an estimated position of the mobile communication device from the acceptable range measurements.

26. The device of claim 25, wherein the average is a fading average of previous range measurements, wherein more recent range measurements are weighted more heavily in determining the fading average.

27. The device of claim 25, wherein said receiver determines the range measurement from a round-trip signal propagation time of ranging signals exchanged between the mobile communication device and the reference communication device.

28. The device of claim 25, wherein said processor: calculates an error between the range measurement and the average of the previous range measurements; determines the accuracy of the range measurement as a function of the error between the range measurement and the average of the previous range measurements and the standard deviation of the previous range measurements; and supplies the accuracy to the tracking system for updating the estimated position of the mobile communication device.

29. The device of claim 28, wherein said receiver includes a rake filter, and wherein said processor determines the accuracy of the range measurement as a function of a number of rake taps used by the rake filter.

30. The device of claim 28, wherein said receiver performs curve fitting of the detected ranging signal to a stored signal replica, and wherein said processor determines the accuracy of the range measurement as a function of a quality of fit of the curve fitting.

31. The device of claim 28, wherein said processor determines the accuracy of the range measurement as a function of a signal-to-noise ratio of the range measurement.

32. The device of claim 28, wherein said processor computes a predicted range between the mobile communication device and the reference communication device based on tracked positions of the mobile communication device and the reference communication device, and estimates the accuracy of the predicted range based on estimated accuracies of the tracked positions of the reference communication device and the mobile communication device, said processor determining the accuracy of the range measurement as a function of the estimated accuracy of the predicted range.

33. The device of claim 25, wherein said processor:

computes a predicted range between the mobile communication device and the reference communication device based on tracked positions of the mobile communication device and the reference communication device;

estimates the accuracy of the predicted range based on estimated accuracies of the tracked positions of the reference communication device and the mobile communication device;

generates a coarse window of acceptability as a function of the predicted range and the estimated accuracy of the predicted range; and supplies the range measurement to the tracking system for updating the estimated position of the mobile communication device if the range measurement is within said coarse window of acceptability and said window of acceptability.

34. A mobile communication device capable of estimating its position by determining ranges to a plurality of reference communication devices having known positions, comprising:

a receiver configured to receive ranging signals from reference communication devices, said receiver generating a range measurement from a detected ranging signal;

a processor configured to receive the range measurement, said processor generating a coarse window of acceptability as a function of a predicted range and an estimated accuracy of the predicted range between the mobile communication device and the reference communication device based on tracked positions of the mobile communication device and the reference communication device, said processor generating a fine window of acceptability as a function of an average and a standard deviation of previous range measurements, said processor finding the range measurement to be acceptable if the range measurement is within both the coarse window of acceptability and the fine window of acceptability; and a tracking system configured to receive acceptable range measurements from said processor, said tracking system updating an estimated position of the mobile communication device from the acceptable range measurements.

35. The device of claim 34, wherein the average of previous range measurements is a fading average of previous range measurements, wherein more recent range measurements are weighted more heavily in determining the fading average.

36. The device of claim 34, wherein said processor determines the range measurement from a round-trip signal propagation time of ranging signals exchanged between the mobile communication device and the reference communication device.

37. The device of claim 34, wherein said processor:

calculates an error between the range measurement and the average of the previous range measurements;

determines the accuracy of the range measurement as a function of the error between the range measurement and the average of the previous range measurements and the standard deviation of the previous range measurements; and supplies the accuracy to the tracking system for updating the estimated position of the mobile communication device.

38. The device of claim 37, wherein said receiver includes a rake filter, and wherein said processor determines the accuracy of the range measurement as a function of a number of rake taps used by the rake filter.

39. The device of claim 37, said receiver performs curve fitting of the detected ranging signal to a stored signal replica, and wherein said processor determines the accuracy of the range measurement as a function of a quality of fit of the curve fitting.

40. The device of claim 37, wherein said processor determines the accuracy of the range measurement as a function of a signal-to-noise ratio of the range measurement.

41. The device of claim 37, wherein said processor determines the accuracy of the range measurement as a function of the estimated accuracy of the predicted range.

42. A mobile communication device capable of estimating its position by determining ranges to a plurality of reference communication devices having known positions, comprising:
- a receiver configured to receive ranging signals from reference communication devices, said receiver generating a range measurement from a detected ranging signal;
- a processor configured to receive the range measurement, said processor computing an average and standard deviation of previous range measurements and determining the accuracy of the range measurement as a function of the standard deviation of the previous range measurements and the difference between the range measurement and the average of the previous range measurements; and
- a tracking system configured to receive acceptable range measurements and corresponding accuracies from said processor, said tracking system updating an estimated position of the mobile communication device from the acceptable range measurements.

43. The device of claim 42, wherein said receiver includes a rake filter, and wherein said processor determines the accuracy of the range measurement as a function of a number of rake taps used by the rake filter.

44. The device of claim 42, wherein said receiver performs curve fitting of the detected ranging signal to a stored signal replica, and wherein said processor determines the accuracy of the range measurement as a function of a quality of fit of the curve fitting.

45. The device of claim 42, wherein said processor determines the accuracy of the range measurement as a function of a signal-to-noise ratio of the range measurement.

46. The device of claim 42, wherein said processor computes a predicted range between the mobile communication device and the reference communication device based on tracked positions of the mobile communication device and the reference communication device, and estimates the accuracy of the predicted range based on estimated accuracies of the tracked positions of the reference communication device and the mobile communication device, said processor determining the accuracy of the range measurement as a function of the estimated accuracy of the predicted range.

47. The device claim 42, wherein the average of the previous range measurements is a fading average of previous range measurements, wherein more recent range measurements are weighted more heavily in determining the fading average.

48. A method of determining whether a measurement is acceptable for use in a tracking system, the method comprising:
(a) determining a measurement value from a detected signal;
(b) determining a variability of previous acceptable measurements;
(c) forming a window of acceptability whose size is based upon the variability of the previous acceptable measurements; and
(d) if the measurement value is within the window of acceptability, supplying the measurement value to the tracking system for updating a state tracked by the tracking system.

49. A The method of claim 48, wherein the window of acceptability is a function of a fading average of the previous acceptable measurements, wherein more recent measurements are weighted more heavily in determining the fading average.

50. The method of claim 48, wherein the measurement value is a range measurement and the tracking system determines the position of an object from a plurality of range measurements.

51. The method of claim 48, further comprising:
(e) calculating an error between the measurement and an average of the previous acceptable measurements;
(f) determining the accuracy of the measurement value as a function of the error between the measurement and the average of the previous acceptable measurements and the variability of the previous acceptable measurements; and
(g) supplying the accuracy to the tracking system for updating the state tracked by the tracking system.

52. A mobile communication device capable of estimating its position by determining ranges to a plurality of reference communication devices having known positions, comprising:
- a receiver configured to receive ranging signals from the reference communication devices, said receiver generating a range measurement from a detected ranging signal;
- a processor configured to generate a window of acceptability whose size is based on a variability of previous acceptable range measurements, said processor determining the range measurement to be acceptable if the range measurement is within the window of acceptability; and
- a navigation system configured to receive acceptable range measurements from said processor, said navigation system updating an estimated position of the mobile communication device based on the acceptable range measurements.

53. The device of claim 52, wherein the window of acceptability is a function of a fading average of the previous acceptable measurements, wherein more recent measurements are weighted more heavily in determining the fading average.

54. The device of claim 52, wherein said receiver determines the range measurement from a round-trip signal propagation time of ranging signals exchanged between the mobile communication device and the reference communication device.

55. The device of claim 52, wherein said processor: calculates an error between the range measurement and an average of the previous acceptable range measurements; determines the accuracy of the range measurement as a function of the error between the range measurement and the average of the previous acceptable range measurements and a variability of the previous acceptable range measurements; and supplies the accuracy to the navigation system for updating the estimated position of the mobile communication device.

56. The device of claim 52, wherein said processor computes a predicted range between the mobile communication device and the reference communication device based on tracked positions of the mobile communication device and the reference communication device, and estimates the accuracy of the predicted range based on estimated accuracies of the tracked positions of the reference communication device and the mobile communication device, said processor determining the accuracy of the range measurement as a function of the estimated accuracy of the predicted range.

57. The device of claim 54, wherein said processor:

computes a predicted range between the mobile communication device and the reference communication device based on tracked positions of the mobile communication device and the reference communication device;

estimates the accuracy of the predicted range based on estimated accuracies of the tracked positions of the reference communication device and the mobile communication device;

generates a coarse window of acceptability as a function of the predicted range and the estimated accuracy of the predicted range; and supplies the range measurement to the navigation system for updating the estimated position of the mobile communication device if the range measurement is within said coarse window of acceptability and said window of acceptability.

58. An apparatus for determining whether a measurement is acceptable for use in a tracking system, the method comprising:

means for determining a measurement value from a detected signal;

means for forming a window of acceptability whose size is based upon the variability of previous acceptable measurements; and means for supplying the measurement value to the tracking system for updating a state tracked by the tracking system in response to the measurement value being within the window of acceptability.

59. The apparatus of claim 58, further comprising:

means for forming another window of acceptability based upon a state tracked by the tracking system, wherein the means for supplying supplies the measurement value to the tracking system in response to the measurement value being within the window of acceptability and said another window of acceptability.

60. A method of determining whether a measurement is acceptable for use in a tracking system, comprising:

(a) determining a measurement value from a detected signal;

(b) generating a first window of acceptability based on a state tracked by the tracking system;

(c) generating a second window of acceptability whose size is based on a variability of previous acceptable measurements;

(d) supplying the measurement value to the tracking system for updating the state tracked by the tracking system in response to the measurement value being within both the first and second windows of acceptability.

61. The method of claim 60, further comprising:

(e) calculating an error between the range measurement and the average of the previous range measurements;

(f) determining an accuracy of the measurement value as a function of a difference between the measurement value and an average of the previous acceptable measurements; and (g) supplying the accuracy to the tracking system for updating the state tracked by the tracking system.

62. The method of claim 60, wherein the first window of acceptability is based on an accuracy of the state tracked.

63. The method of claim 60, wherein the second window of acceptability is based on a standard deviation of the previous acceptable measurements.

64. A mobile communication device capable of estimating its position by determining ranges to a plurality of reference communication devices having known positions, comprising:

a receiver configured to receive ranging signals from the reference communication devices, said receiver generating a range measurement from a detected ranging signal;

a processor configured to generate: a first window of acceptability whose size is based on a tracked range between the mobile communication device and the reference communication device; and a second window of acceptability based on a variability of previous acceptable range measurements, said processor determining the range measurement to be acceptable if the range measurement is within the first and second windows of acceptability; and a navigation system configured to receive acceptable range measurements from said processor, said navigation system updating an estimated position of the mobile communication device based on the acceptable range measurements.

65. The device of claim 64, wherein said processor:

calculates an error between the range measurement and the average of the previous acceptable range measurements;

determines the accuracy of the range measurement as a function of the error between the range measurement and the average of the previous acceptable range measurements and the standard deviation of the previous acceptable range measurements; and supplies the accuracy to the navigation system for updating the estimated position of the mobile communication device.

66. The device of claim 64, wherein the first window of acceptability is based on an estimated accuracy of the tracked range.

67. The device of claim 64, wherein the second window of acceptability is based on a standard deviation of the previous acceptable range measurements.

* * * * *